(12) United States Patent
Tamura

(10) Patent No.: US 6,618,091 B1
(45) Date of Patent: *Sep. 9, 2003

(54) IMAGE PICKUP APPARATUS HAVING IMAGE SIGNAL STATE ADJUSTING MEANS A RESPONSE CHARACTERISTIC OF WHICH IS CONTROLLED IN ACCORDANCE WITH IMAGE MAGNIFICATION RATE

(75) Inventor: Kyoji Tamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,617

(22) Filed: Sep. 5, 1996

(30) Foreign Application Priority Data

Sep. 14, 1995 (JP) ............................... 7-236961

(51) Int. Cl.[7] ............................... H04N 5/238
(52) U.S. Cl. ................ 348/363; 348/223.1; 348/240.99
(58) Field of Search ............................... 348/223.1, 363, 348/361, 224.1, 240.3, 240.99, 208.11, 208.12, 169, 170, 362, 221.1, 240, 229.1, 230.1; H04N 5/235

(56) References Cited

U.S. PATENT DOCUMENTS

| | | | | | |
|---|---|---|---|---|---|
| 5,258,848 | A | * | 11/1993 | Kondo et al. ............... | 348/229 |
| 5,319,449 | A | * | 6/1994 | Satio et al. ................ | 348/223 |
| 5,400,074 | A | * | 3/1995 | Shimizu ..................... | 348/363 |
| 5,420,632 | A | * | 5/1995 | Yamagiwa .................. | 348/240 |
| 5,448,292 | A | * | 9/1995 | Matsui et al. .............. | 348/224 |
| 5,455,685 | A | * | 10/1995 | Mori ........................ | 348/363 |
| 5,502,484 | A | * | 3/1996 | Okada ....................... | 348/240 |
| 5,543,839 | A | * | 8/1996 | Suda et al. ................ | 348/349 |
| 5,557,328 | A | * | 9/1996 | Ishihama et al. ........... | 348/358 |
| 5,610,654 | A | * | 3/1997 | Parulski et al. ............ | 348/229 |
| 5,818,523 | A | * | 10/1998 | Ban ......................... | 348/224 |
| 5,959,670 | A | * | 9/1999 | Tamura et al. ............. | 348/364 |

* cited by examiner

*Primary Examiner*—Wendy R. Garber
*Assistant Examiner*—Jacqueline Wilson
(74) *Attorney, Agent, or Firm*—Robin, Blecker & Daley

(57) ABSTRACT

An image pickup apparatus is capable of suppressing a sharp variation in the state of exposure due to a variation in a field of view or a subject image, by varying the response characteristics of an exposure control device, such as an iris, a shutter or a gain, in accordance with an image magnifying rate which becomes higher as an image is electronically magnified by the operation of an electronic zoom.

21 Claims, 12 Drawing Sheets

FIG. 7

| FOCAL LENGTH | CORRECTION COEFFICIENT(k) |
|---|---|
| zoom 1 | 1 |
| zoom 2 | 1 |
| zoom 3 | 1 |
| zoom 4 | 0.9 |
| zoom 5 | 0.9 |
| zoom 6 | 0.8 |
| zoom 7 | 0.8 |
| zoom 8 | 0.7 |
| zoom 9 | 0.6 |
| zoom 10 | 0.5 |
| zoom 11 | 0.4 |
| zoom 12 | 0.3 |
| zoom 13 | 0.2 |

WIDE-ANGLE END

OPTICAL ZOOM

ELECTRONIC ZOOM

TELEPHOTO END

| FOCAL LENGTH | CONTROL INTERVAL(W) (NUMBER OF FIELDS) |
|---|---|
| zoom 1 | 1 |
| zoom 2 | 1 |
| zoom 3 | 1 |
| zoom 4 | 2 |
| zoom 5 | 2 |
| zoom 6 | 3 |
| zoom 7 | 3 |
| zoom 8 | 4 |
| zoom 9 | 5 |
| zoom 10 | 6 |
| zoom 11 | 7 |
| zoom 12 | 8 |
| zoom 13 | 9 |

FIG. 12

WIDE-ANGLE END

↑

OPTICAL ZOOM

↓

↑

ELECTRONIC ZOOM

↓

TELEPHOTO END

| FOCAL LENGTH | CONTROL INTERVAL (W) (NUMBER OF FIELDS) |
|---|---|
| zoom 1 | 4 |
| zoom 2 | 4 |
| zoom 3 | 4 |
| zoom 4 | 5 |
| zoom 5 | 5 |
| zoom 6 | 6 |
| zoom 7 | 7 |
| zoom 8 | 8 |
| zoom 9 | 9 |
| zoom 10 | 10 |
| zoom 11 | 11 |
| zoom 12 | 12 |
| zoom 13 | 13 |

IMAGE PICKUP APPARATUS HAVING IMAGE SIGNAL STATE ADJUSTING MEANS A RESPONSE CHARACTERISTIC OF WHICH IS CONTROLLED IN ACCORDANCE WITH IMAGE MAGNIFICATION RATE

BACKGROUND OF THE INVENTION

1. Field of the Inventions

The present invention relates to an image pickup apparatus and, more particularly, to exposure control and white balance control for the image pickup apparatus.

2. Description of the Related Art

The advance of image pickup apparatuses, such as video cameras, has heretofore been remarkable, and the number of functions per apparatus has been becoming larger and larger.

One example of a conventional image pickup apparatus is shown in FIG. 1 in block form.

The image pickup apparatus shown in FIG. 1 includes a zoom lens 1 which is made from a lens group for forming an image of a subject and has a focal length which can be varied, an iris mechanism 3 such as an iris having an iris blade structure for controlling the amount of incident light or a liquid crystal plate for controlling the amount of passing light (in this example, the iris mechanism 3 employs an iris), a driving motor 4 for driving the iris mechanism 3, iris mechanism driving means 5 for driving the driving motor 4, an image pickup element 6 for photoelectrically converting incident light, image pickup element driving means 7 for controlling the image pickup element 6 to read a photoelectric signal therefrom and for controlling a signal storage time, i.e, a so-called electric shutter function, CDS (correlation double sampling)/AGC means 8 for performing automatic gain control (hereinafter referred to as "AGC") for sampling the photoelectric signal supplied from the image pickup element 6 and electrically amplifying the sampled signal, analog-digital conversion means 9 for converting the analog signal outputted from the CDS/AGC means 8 into a digital signal, camera signal processing means 10 for applying processing, such as gamma correction, color separation and color-difference matrix transformation, to the digital signal and adding a synchronizing signal to the processed digital signal to produce a standard television signal, digital-analog conversion means 11 for converting the output signal of the camera signal processing means 10 from digital state to analog state, electronic image magnifying processing means 12 for taking out a signal from the front stage of the camera signal processing means 10, electrically performing image magnifying processing of the signal and returning the processed signal to the camera signal processing means 10, and a microcomputer 15 which has exposure control means for controlling exposure by controlling the iris mechanism 3, the electronic shutter function of the image pickup element 6 and the AGC of the CDS/AGC means 8, and control means for controlling the electronic image magnifying processing means 12.

The image pickup apparatus having the above-described arrangement includes means which enables a subject aimed at by a photographer to be photographed as an image magnified to a size desired by the photographer. As such means, there are an optical-zoom function for varying the focal length of the zoom lens 1 and optically controlling the size of a subject image to be formed on the image pickup element 6 and a so-called electronic-zoom function for electrically magnifying an image by using the electronic image magnifying processing means 12.

The image pickup apparatus also includes photographing-operation assistant means which assists in a photographing operation. As such photographing-operation assistant means, there are automatic exposure control means for automatically performing optimum control of the state of exposure of a subject, automatic white balance control means for automatically adjusting color temperature, i.e., automatically optimizing the state of white balance, and the like. These photographing-operation assistant means are intended to enable a photographer to obtain an optimum image through a simple photographing operation even if the photographer varies the size of a subject image by using the zoom lens 1 or the electronic image magnifying processing means 12, or even if the photographer carries out photography at any place under any situation.

The automatic exposure control means which is one of the photographing-operation assistant means will be described below.

The automatic exposure control means is controlled by the exposure control means of the microcomputer 15 according to the control flowchart shown in FIG. 2. First, in an exposure data detecting step S1001, the automatic exposure control means obtains exposure data by detecting a variation in the brightness of a subject from a luminance level contained in a video signal supplied from the camera signal processing means 10.

In the exposure data detecting step S1001, to obtain the exposure data, the automatic exposure control means detects a signal which has not yet been subjected to the processing of the electronic image magnifying processing means 12, or only a video signal corresponding to a magnified area if electronic image magnifying processing is performed. However, the automatic exposure control means may detect a signal which has been subjected to the processing of the electronic image magnifying processing means 12.

Then, the automatic exposure control means determines whether the state of exposure is correct, from the signal detected in the exposure data detecting step S1001, and if the state of exposure is correct (S1002, YES), the automatic exposure control means outputs the current exposure control value, Eo, without performing correction (S1009). If the state of exposure is not correct (S1002, NO), the process proceeds to an amount-of-exposure-correction computing step S1003, in which, on the basis of the detected signal obtained in the exposure data detecting step S1001, the automatic exposure control means selects exposure control parameters from among the iris mechanism 3, an electronic shutter which controls the storage time of the image pickup element 6, the gain of the AGC of the CDS/AGC means 9 and the like, and computes the amount of exposure correction, C, relative to each selected exposure control parameter (S1003). Then, if the state of exposure is brighter than a correct value (S1004, YES), the process proceeds to an exposure-control-value decreasing processing step S1006, in which the state of exposure is made darker. If the state of exposure is not brighter than the correct value (S1004, NO), the process proceeds to an exposure-control-value increasing processing step S1005, in which the state of exposure is made brighter. In either of the exposure-control-value decreasing processing step S1006 and the exposure-control-value increasing processing step S1005, an exposure control value En is obtained by correcting the exposure control value Eo which is currently outputted, by using the amount of exposure correction, C, computed in the amount-of-exposure-correction computing step S1003. Then, the exposure control value Eo is updated with the exposure control value En obtained by correcting the exposure control value Eo which is currently outputted (S1007), and the automatic exposure control means outputs the updated exposure control value Eo (S1009). Thus, the automatic exposure control means can effect the control of providing optimum exposure which can follow variations in the brightness of a subject at all times, so that the automatic exposure control means can automatically perform optimum exposure control without compelling the photographer to perform a bothersome manual operation, even if the brightness of the subject varies.

The automatic white balance control means is controlled according to the control flowchart shown in FIG. 3. First, the automatic white balance control means detects a variation in the color of a subject from a video signal supplied from the camera signal processing means 10 (S1101), and determines whether the state of white balance is correct, from the signal (color data) detected in Step S1101 (S1102). If the state of white balance is correct (S1102, YES), the automatic white balance control means outputs the current color gain control value, Co, without performing correction (S1105). If the state of white balance is not correct (S1102, NO), the automatic white balance control means computes a color gain correction value Cn (S1103). Then, the color gain correction value Co is updated with the color gain correction value Cn (S1104), and the automatic white balance control means outputs the updated color gain correction value Co (S1105). Thus, the automatic white balance control means can automatically effect optimum white balance control without compelling the photographer to perform a bothersome manual operation, even if the state of white balance varies. Incidentally, although the color data is obtained by detecting a signal which has been subjected to the processing of the electronic image magnifying processing means 12, the color data may be obtained by detecting a signal which has not yet been subjected to the processing of the electronic image magnifying processing means 12.

In recent years, more photographers have had more opportunities to perform photography of higher image magnifying rates owing to the development of zoom lenses having higher zoom magnifications or owing to the spread of use of the electronic image magnifying means. However, in the case of photography of high image magnifying rates, a field of view or a subject image tends to greatly vary with a small vibration of the image pickup apparatus due to a hand shake or the like, and the brightness or the state of color of a subject at which the image pickup apparatus is aimed greatly varies. In other words, the above-described automatic exposure control means at all times controls the state of exposure according to the brightness of light which is reflected from a subject and passes through the zoom lens 1, so that the automatic exposure control means sensitively follows even a small variation in the field of view or the subject image during the photography of high image magnifying rates and a variation occurs in the brightness of a main subject to be located within the image plane of the image pickup apparatus.

In addition, since the automatic white balance control means similarly sensitively follows a variation in the field of view or the subject image, a variation occurs not only in the state of exposure of the main subject but also in the state of white balance of the main subject, so that a visually greatly impaired image is formed.

SUMMARY OF THE INVENTION

It is, therefore, one object of the present invention to provide an image pickup apparatus which is capable of performing smooth exposure control and smooth white balance control even if image magnifying means is used to perform the processing of magnifying an image.

To achieve the above object, in accordance with one aspect of the present invention, there is provided an image pickup apparatus which comprises image pickup means, adjusting means for adjusting a state of a picked-up image by performing predetermined processing on a picked-up image signal outputted from the image pickup means, image magnifying means for magnifying an image, and control means for controlling a response characteristic of the adjusting means according to an image magnifying rate of the image magnifying means.

In accordance with another aspect of the present invention, there is provided an image pickup apparatus which comprises a photographing optical system, an image pickup element for picking up an image formed by the photographing optical system, image signal processing means for performing processing on an output signal of the image pickup element and producing a predetermined image signal, exposure control means for controlling a state of exposure of the image pickup element, image magnifying means for magnifying a size of an image represented by the predetermined image signal, and control means for controlling a response characteristic of the exposure control means in accordance with an image magnifying rate of the image magnifying means.

In accordance with another aspect of the present invention, there is provided an image pickup apparatus which comprises a photographing optical system, an image pickup element for picking up an image formed by the photographing optical system, image signal processing means for performing processing on an output signal of the image pickup element and producing a predetermined image signal, white balance control means for controlling a white balance of the predetermined image signal, image magnifying means for magnifying a size of an image represented by the predetermined image signal, and control means for controlling a response characteristic of the white balance control means in accordance with an image magnifying rate of the image magnifying means.

The above and other objects and aspects of the present invention will become apparent from the following detailed description of preferred embodiments of the present invention, taken in conjunction with the accompanying drawings.

BRIEF DESCRIPTION OF THE DRAWINGS

FIG. 7 is a look-up table used in the first embodiment;

FIG. 12 is a look-up table used in the third embodiment.

DETAILED DESCRIPTION OF THE PREFERRED EMBODIMENTS

Preferred embodiments of the image pickup apparatus according to the present invention will be described below in detail with reference to the accompanying drawings.

The present invention can be practiced in the form of a video camera, a camera-integrated type VTR or the like. In addition, the present invention can be practiced in combination with various image magnifying means using various photographing optical systems, such as a zoom lens which can continuously vary its focal length without varying its focus, a variable focus lens which can continuously vary its focal length but allows its focus to vary with a variation in its focal length, a (turret-like) changeover lens which can vary its focal length by changing over a plurality of lenses having different focal lengths from one lens to another, and an interchangeable lens system which interchangeably uses a plurality of lenses having different focal lengths.

By way of example, the following detailed description will be made in connection with a video camera using a zoom lens.

Figure 1:
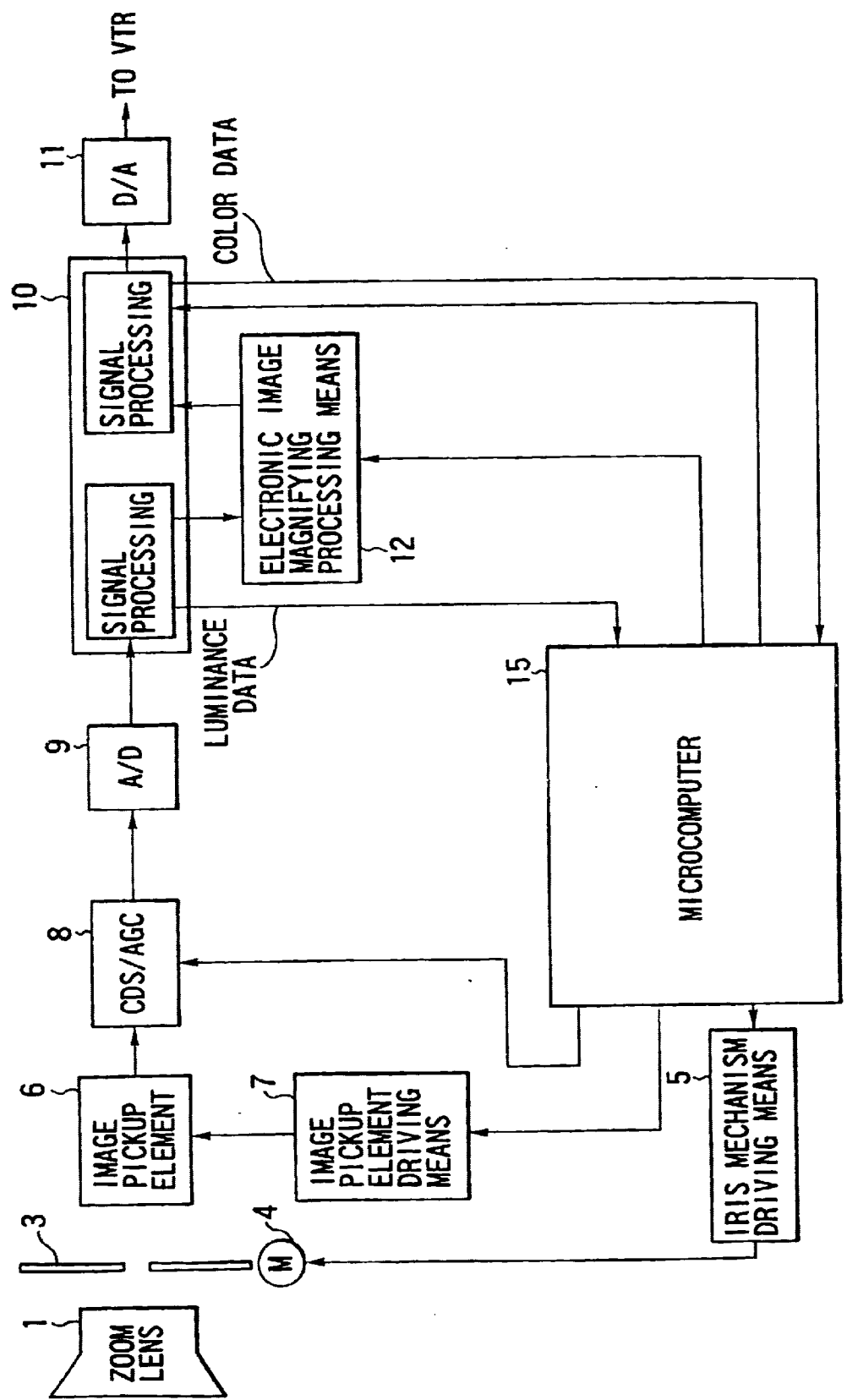
FIG. 1 is a block diagram showing the arrangement of a video camera.
Figure 5:
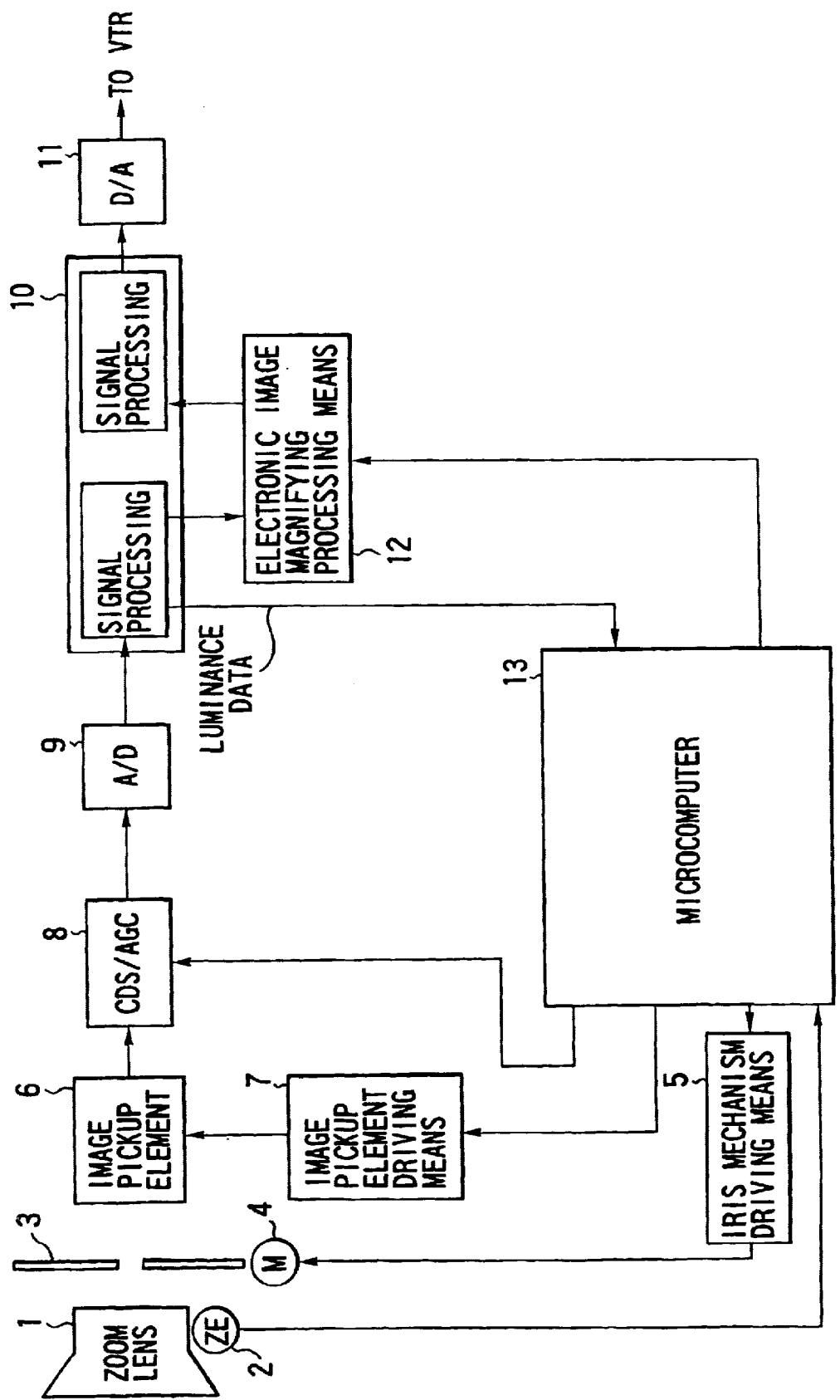
FIG. 5 is a block diagram showing the arrangement of a first embodiment of the present invention.

FIG. 5 is a block diagram showing the arrangement of a video camera according to a first embodiment of the present invention. In FIG. 5, identical reference numerals are used to denote constituent elements having functions similar to those of the corresponding constituent elements used in the arrangement of FIG. 1. The first embodiment processes a video signal by a process similar to that used in the arrangement of FIG. 1, but differs from the above-described arrangement in that focal length detecting means 2 for detecting the focal length of a zoom lens 1 is added, and in that the microcomputer 15 shown in FIG. 1 is replaced with a microcomputer 13 in which assistant-function correcting means for correcting the response characteristics of exposure control according to the focal length of the zoom lens 1 and the image magnifying rate of electronic image magnifying processing means 12 is added to the microcomputer 15. The internal processing of the microcomputer 13 is performed in accordance with the control flowchart shown in FIG. 6.

Figure 6:
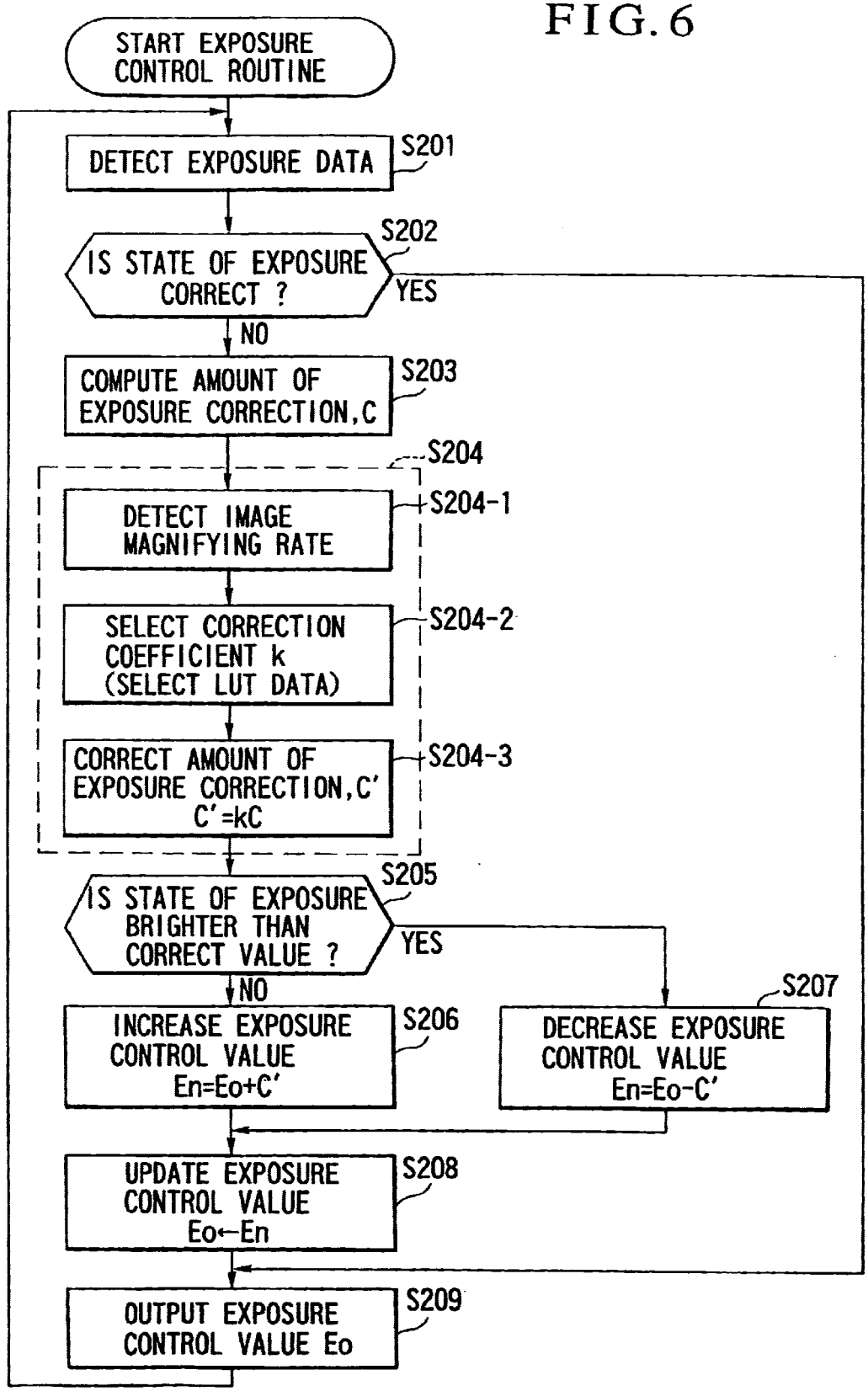
FIG. 6 is a control flowchart of exposure control means of the first embodiment.

In the description of the first embodiment, reference will be made to exposure control means as one example of photographing-operation assistant means, and the operation of the assistant-function correcting means of the exposure control means will be described below with reference to the control flowchart shown in FIG. 6.

Figure 2:
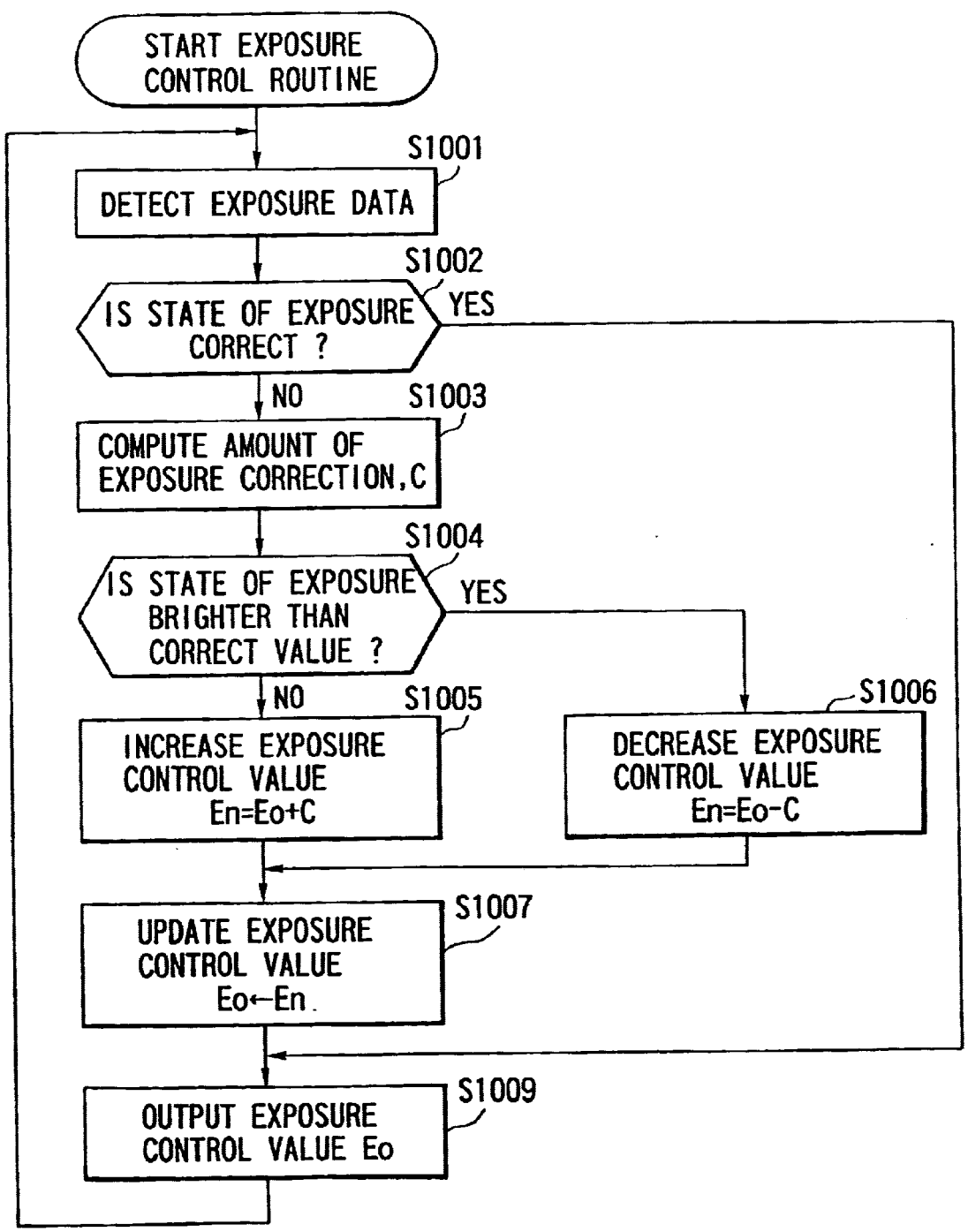
FIG. 2 is a control flowchart of exposure control means.
Figure 3:
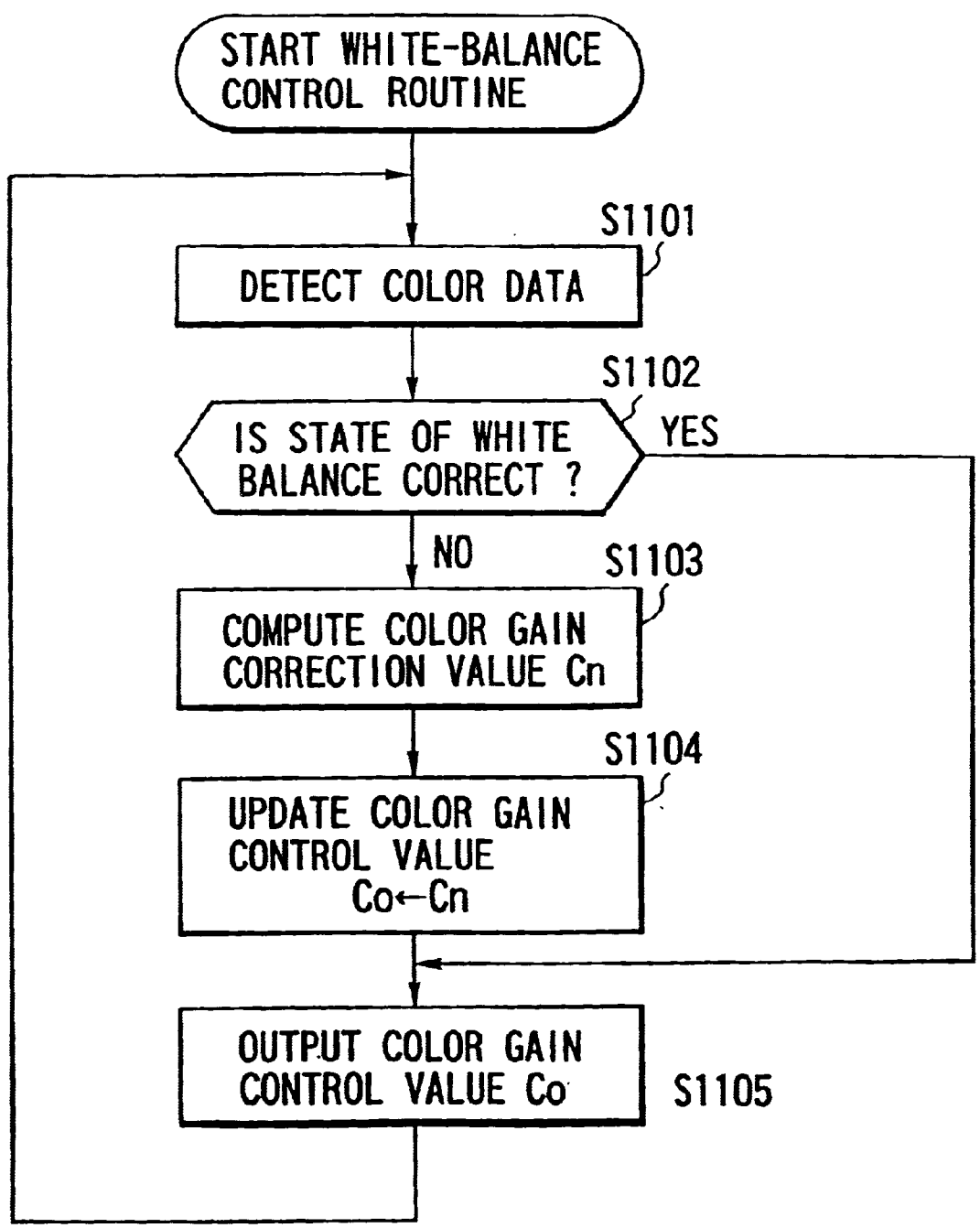
FIG. 3 is a control flowchart of white balance control means.

Similarly to the control flowchart of FIG. 2, in an exposure data detecting step S201, the exposure control means first detects a variation in the brightness of a subject from a luminance level contained in a video signal supplied from camera signal processing means 10. The exposure control means determines from the detected signal whether the state of exposure is correct, and if the state of exposure is correct (S202, YES), the exposure control means outputs the current exposure control value, Eo, without performing correction (S209). If the state of exposure is not correct (S202, NO), the process proceeds to an amount-of-exposure-correction computing step S203, in which, on the basis of the detected signal obtained in the exposure data detecting step S201, the exposure control means selects exposure control parameters from among an iris mechanism 3, an electronic shutter which controls the storage time of an image pickup element 6, the gain of the AGC of CDS/AGC means 9 and the like, and computes the amount of exposure correction, C, relative to each selected exposure control parameter (S203).

Then, in assistant-function correcting means S204, the process proceeds to an image magnifying rate detecting step S204-1, in which an image magnifying rate is detected from the image magnifying rate of the electronic image magnifying processing means 12 and the focal length of the zoom lens 1 which has been obtained from the output signal of the focal length detecting means 2. In a correction coefficient selecting step S204-2, a correction coefficient k corresponding to the aforesaid detected image magnifying rate is selected from a look-up table (LUT), such as that shown in FIG. 7, which stores data indicative of correction coefficients one of which corresponds to the amount of exposure correction, C, which has been obtained in the amount-of-exposure-correction computing step S203 according to the focal length of the zoom lens 1 and the image magnifying rate of the electronic image magnifying processing means 12. Then, in a correction computing step S204-3, the following correction processing is performed to obtain a corrected amount of exposure correction, C':

$C'=kC$.

For example, if the image magnifying rate detected in the image magnifying rate detecting step S204-1 corresponds to the wide-angle end of the focal length of the zoom lens 1, a correction coefficient k=1 which is data corresponding to zoom 1 in the LUT of FIG. 7 is selected in the correction coefficient selecting step S204-2, and the amount of exposure correction, C, obtained in the amount-of-exposure-correction computing step S203 is outputted without correction (S204).

However, if the image magnifying rate varies up to the optical telephoto end of the zoom lens 1, a correction coefficient k=0.5 which is data corresponding to zoom 10 in the LUT of FIG. 7 is selected in the correction coefficient selecting step S204-2, and the value C', which is corrected so that the amount of exposure correction, C, obtained in the amount-of-exposure-correction computing step S203 is reduced to ½, is outputted (S204).

Thus, even if the variation in the brightness of the subject, which has been detected in the exposure data detecting step S201, is equal between a wide-angle side on which the image magnifying rate is low and a telephoto side on which the image magnifying rate is high, the amount of exposure control to be performed on such variation through one cycle of execution of the flowchart differs between the wide-angle side and the telephoto side, and the response of exposure control to the variation in the brightness of the subject becomes slow on the telephoto side on which the image magnifying rate is high.

Figure 4:
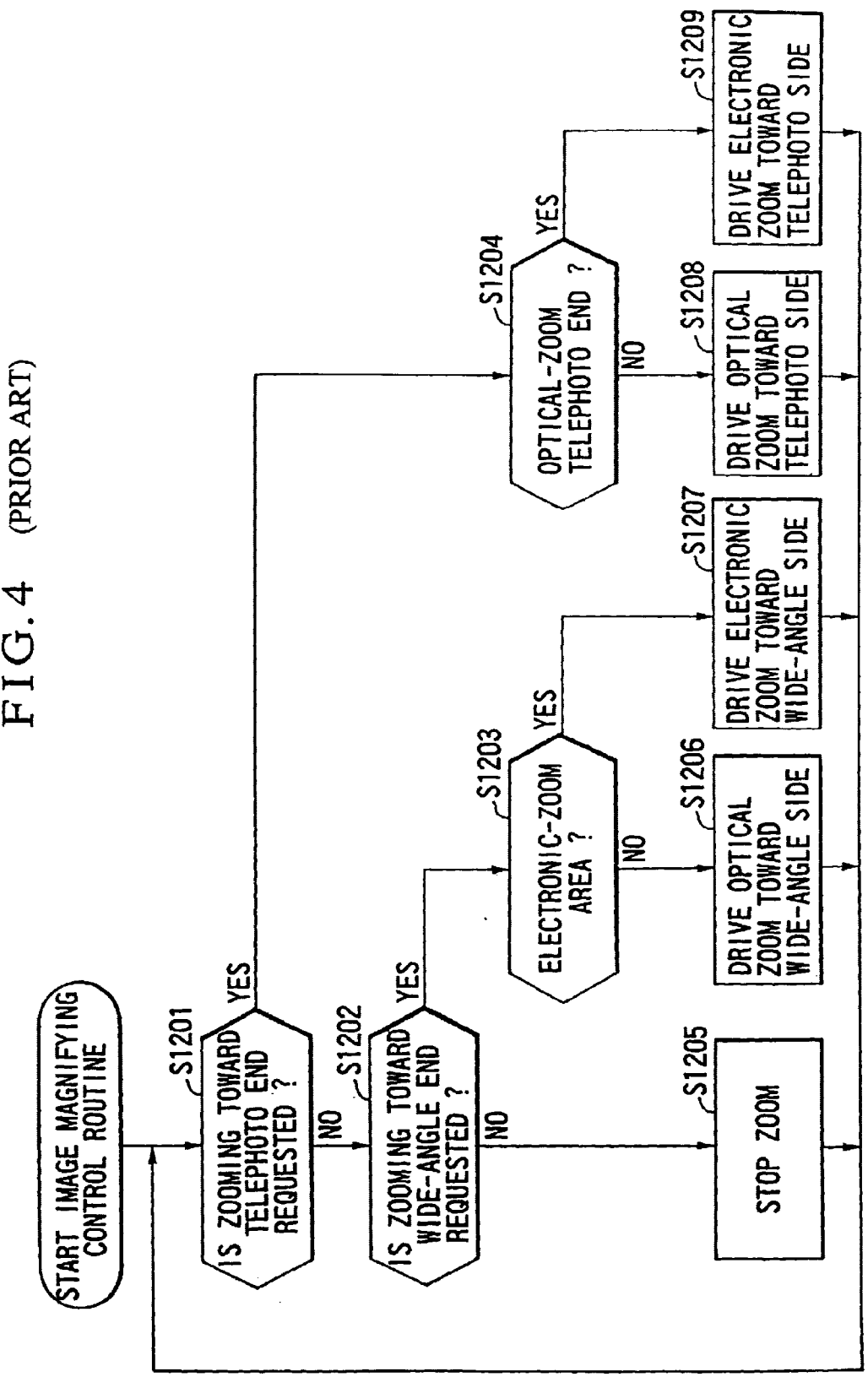
FIG. 4 is a control flowchart of image magnifying means.

For the electronic image magnifying processing means 12 which amplifies the image to a further extent (S1209) after the zoom lens 1 has reached the optical telephoto end (S1204, YES), as shown in the control flowchart shown in FIG. 4 by way of example, the LUT shown in FIG. 7 is provided with additional correction coefficients corresponding to the image magnifying rate of the electronic image magnifying processing means 12, in the form of data corresponding to, for example, zoom11 to zoom13 which follow an optical zoom range as shown in FIG. 7. Incidentally, since the electronic image magnifying processing means 12 is controlled by the microcomputer 13, the image magnifying rate can be easily detected by the microcomputer 13.

If the amount of exposure correction, C', is obtained (refer to FIG. 6), the process proceeds to Step S205. Similarly to the control flowchart of FIG. 2, if the state of exposure is brighter than a correct value (S205, YES), the process proceeds to an exposure-control-value decreasing processing step S207, in which the state of exposure is made darker. If the state of exposure is not brighter than the correct value (S205, NO), the process proceeds to an exposure-control-value increasing processing step S206, in which the state of exposure is made brighter. In either of the exposure-control-value decreasing processing step S207 and the exposure-control-value increasing processing step S206, the exposure control means obtains an exposure control value En by correcting an exposure control value Eo which is currently outputted, by using the amount of exposure correction, C'. Then, the exposure control value Eo is updated with the exposure control value En obtained by correcting the exposure control value Eo which is currently outputted (S208), and the exposure control means outputs the updated exposure control value Eo (S209). Thus, it is possible to effect exposure control which provides optimum exposure which follows the brightness of the subject at all times.

According to the above-described control, even if photography is performed on the telephoto side on which the image magnifying rate is high, the variation of the amount of exposure control is made slower on the telephoto side than on the wide-angle side. Accordingly, even if a small variation in a field of view or a subject image is caused by a hand shake or the like, the state of exposure is prevented from undergoing a sensitive variation, so that it is possible to obtain an image in which the brightness of a main subject to be located within the image plane is kept stable at all times. On the telephoto side on which an image is magnified, even a small hand shake causes a large variation in the field of view or the subject image, so that the state of exposure and the state of white balance also vary to a great extent. However, according to the present invention, it is possible to realize stable control even on the telephoto side.

The hardware arrangement of a second embodiment of the present invention is similar to that of the first embodiment, and the second embodiment and the first embodiment differ in only the exposure control means inside the microcomputer 13 of FIG. 5.

Figure 8:
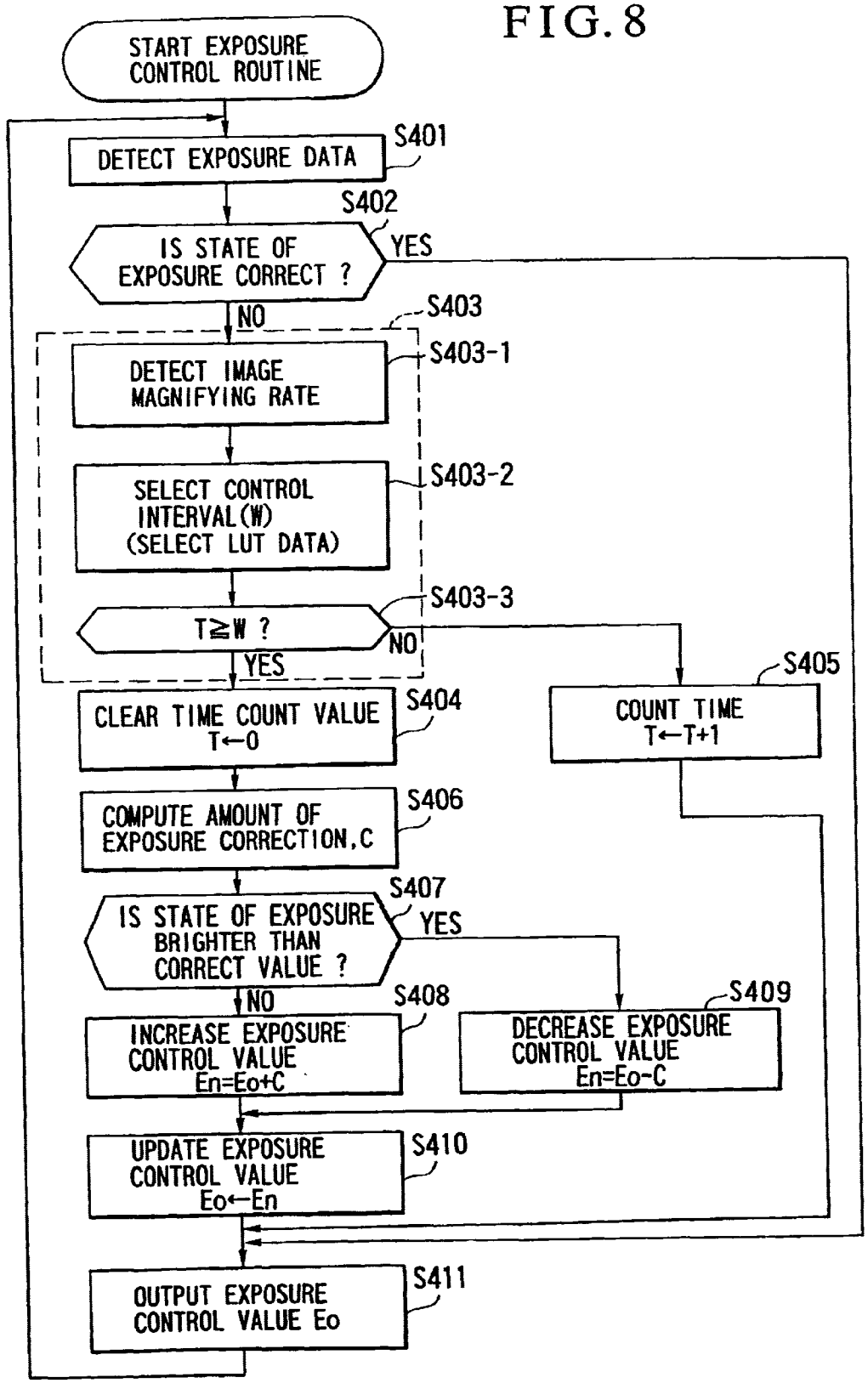
FIG. 8 is a control flowchart of exposure control means of a second embodiment of the present invention.

The operation of assistant-function correcting means which constitutes a feature of the second embodiment will be described below with reference to the control flowchart shown in FIG. 8.

Figure 9:
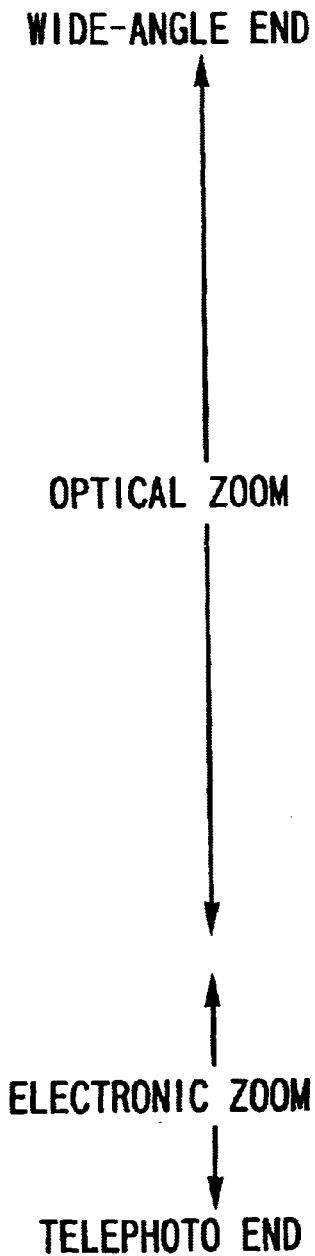
FIG. 9 is a look-up table used in the second embodiment.

Similarly to the control flowchart of FIG. 2, in an exposure data detecting step S401, the exposure control means first detects a variation in the brightness of a subject from a luminance level contained in a video signal supplied from the camera signal processing means 10. The exposure control means determines from the detected signal whether the state of exposure is correct, and if the state of exposure is correct (S402, YES), the exposure control means outputs the current exposure control value, Eo, without performing correction (S411). If the state of exposure is not correct (S402, NO), the exposure control means executes the processing of assistant-function correcting means S403 according to the second embodiment. In the assistant-function correcting means S403, the process proceeds to an image magnifying rate detecting step S403-1, in which the focal length of the zoom lens 1 and the image magnifying rate of the electronic image magnifying processing means 12 are detected. In a control interval selecting step S403-2, a control interval W is selected from the LUT, shown in FIG. 9, of the second embodiment according to the image magnifying rate detected in the image magnifying rate detecting step S403-1. The minimum unit of the LUT data of FIG. 9 is one field period. Then, a value T of time counting means for counting time is compared with the control interval W selected from the LUT shown in FIG. 9, and if the value T of the time counting means reaches the selected control interval W (S403-3, YES), the exposure control means performs the processing of computing an exposure control value corresponding to the variation in the brightness of the subject which has been detected in the exposure data detecting step S401, in a manner similar to that described previously in connection with the control flowchart of FIG. 2. If the time T does not reach the control interval W (S403-3, NO), the exposure control value Eo is not updated (S411).

In this manner, if a variation in the brightness of a subject is detected in the exposure data detecting step S401, the exposure control means performs exposure control capable of correcting the state of exposure with fast response, on the wide-angle side on which the image magnifying rate is low. However, on the telephoto side on which the image magnifying rate is high, even if a variation in the brightness of a subject is detected, the interval of exposure control is increased so that exposure control can be performed with slow response. Thus, since the response of exposure control to the variation in the brightness of the subject is made slow, even if a small variation in a field of view or a subject image is caused by a hand shake or the like during photography of high image magnifying rates, the state of exposure is prevented from undergoing a sensitive variation, so that it is possible to obtain an image in which the brightness of a main subject to be located within the image plane is kept stable at all times.

Figure 10:
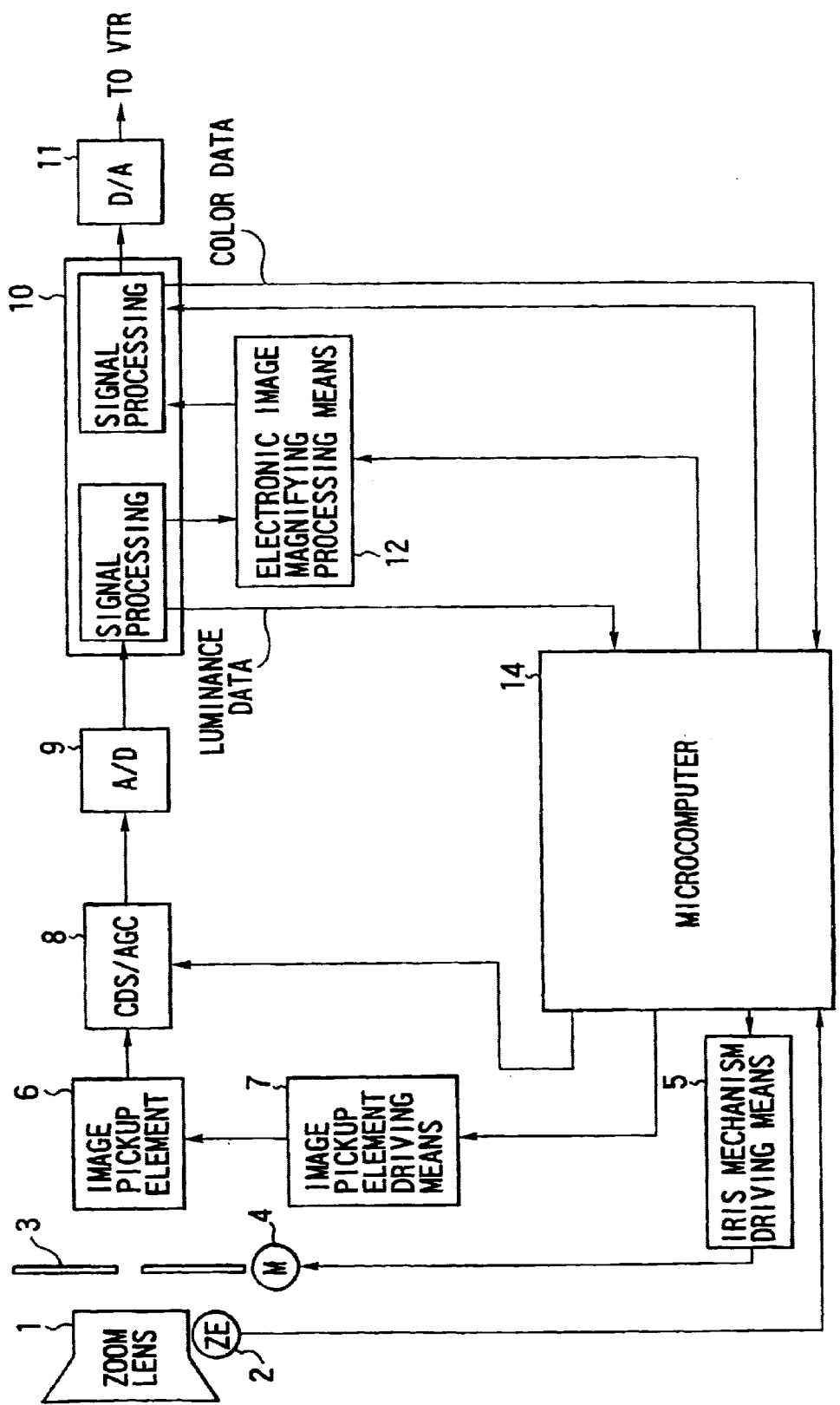
FIG. 10 is a block diagram showing the arrangement of a third embodiment of the present invention.

FIG. 10 is a block diagram showing the arrangement of a third embodiment of the present invention.

Although, in each of the first and second embodiments described above, only the exposure control value is corrected according to the image magnifying rate, the third embodiment is arranged to correct a white balance control value as well.

In the arrangement shown in FIG. 10, a microcomputer 14 is further provided with means for correcting the white balance control value according to the image magnifying rate. The exposure control of the microcomputer 14 is similar to the exposure control operation described previously in connection with the first embodiment.

Figure 11:
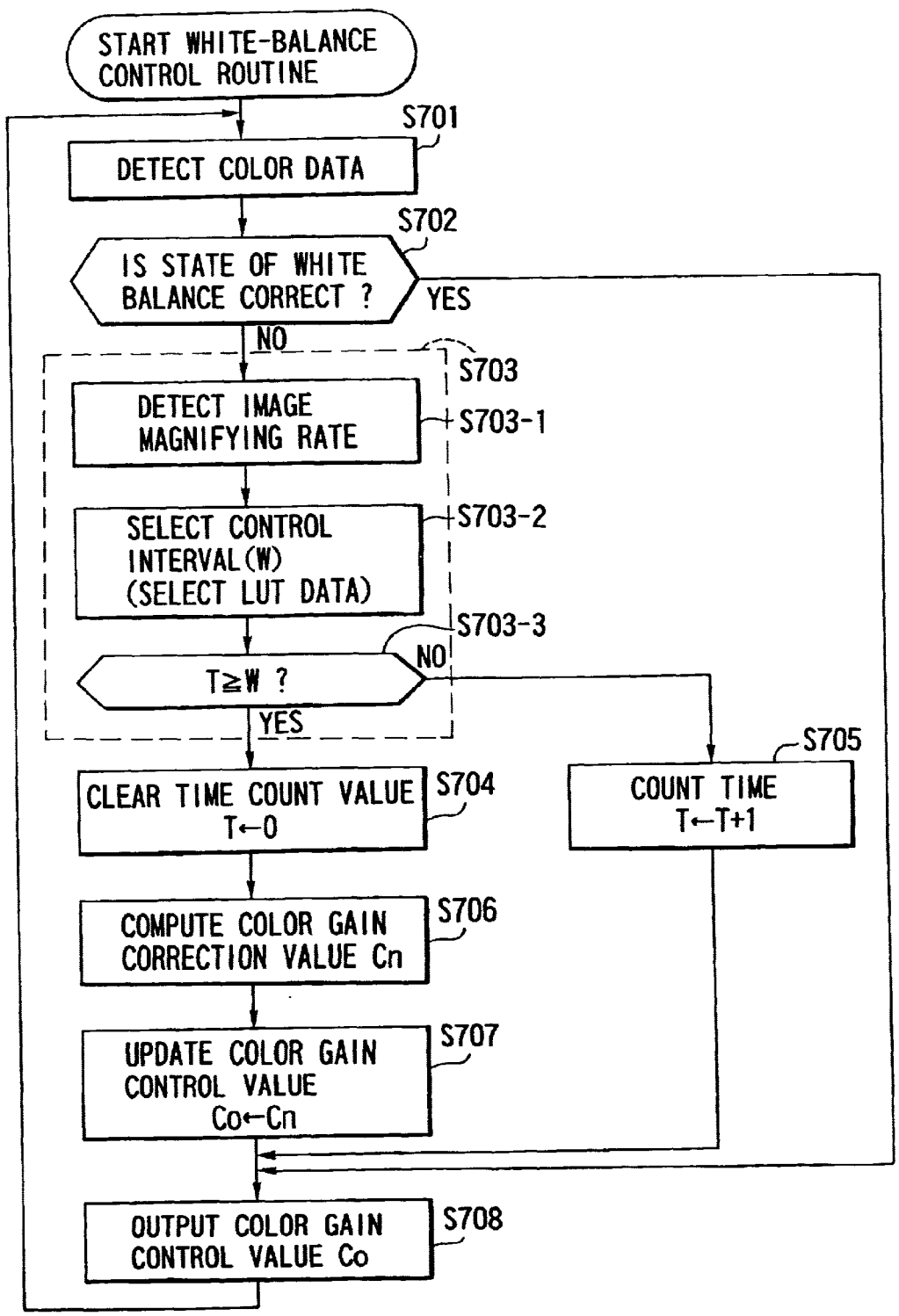
FIG. 11 is a control flowchart of white balance control means of the third embodiment of the present invention.

The operation of assistant-function correcting means which constitutes a feature of the third embodiment will be described below with reference to FIG. 11 which shows the white balance control flowchart of the microcomputer 14.

First, in a color data detecting step S701, the white balance control means of the microcomputer 14 first detects a variation in the color of a subject from a video signal supplied from the camera signal processing means 10. The white balance control means determines from the detected signal whether the state of white balance is correct, and if the state of exposure is correct (S702, YES), the white balance control means outputs the current color gain control value, Co, without performing correction (S708). If the state of white balance is not correct (S702, NO), the white balance control means executes the processing of assistant-function correcting means S703. In the assistant-function correcting means S703, the process proceeds to an image magnifying rate detecting step S703-1, in which the focal length of the zoom lens 1 and the image magnifying rate of the electronic image magnifying processing means 12 are detected. In a control interval selecting step S703-2, a control interval W is selected from the LUT, shown in FIG. 12, of the third embodiment according to the image magnifying rate detected in the image magnifying rate detecting step S703-1. The minimum unit of the LUT data of FIG. 12 is one field period. Then, a value T of the time counting means for counting time is compared with the control interval W selected from the LUT shown in FIG. 12, and if the value T of the time counting means does not reach the selected control interval W (S703-3, NO), the color gain control value Co is not updated and the state of white balance is maintained (S708). If the value T of the time counting means reaches the selected control interval W (S703-3, YES), the white balance control means computes a color gain correction value Cn for color gain control means for controlling the color gains of red (R) and blue (B) in the camera signal processing means 10, according to the variation in the color of the subject detected in the color data detecting step S701 (S706). Then, the color gain control value Co is updated with the color gain correction value Cn (S707), and the white balance control means outputs the updated color gain control value Co (S708). Thus, the state of white balance is varied in response to the variation in the color of the subject.

According to the above-described white balance control, even if a variation in the color of a subject, which has been detected in the color data detecting step S701, is equal between the wide-angle side on which the image magnifying rate is low and the telephoto side on which the image magnifying rate is high, the amount of color gain control to be applied to such variation differs between the wide-angle side and the telephoto side, and the response of color gain control to the variation in the color of the subject becomes slow on the telephoto side on which the image magnifying rate is high. Accordingly, even if a field of view or a subject image is varied by a hand shake or the like and the state of color of a subject greatly varies, stable white balance control can be performed.

In addition, even if the electronic image magnifying processing means 12 is employed, correction can be effected by using a control interval according to the image magnifying rate of the electronic image magnifying processing means 12, as shown in the LUT shown in FIG. 12.

As is apparent from the foregoing description, according to each of the embodiments described above, it is possible to obtain an image in which the state of exposure and the state of white balance are kept visually natural, even if a zoom lens, electronic image magnifying means or the like is used to perform photography accompanied by image magnification.

What is claimed is:

1. An image pickup apparatus comprising:
   image pickup means;
   iris means for adjusting a quantity of an incident light;
   image magnifying means for magnifying an image; and
   control means for controlling to reduce a response speed of said iris means according to an increase of an image magnifying value of said image magnifying means.

2. An image pickup apparatus according to claim 1, wherein said image magnifying means is an optical zoom lens.

3. An image pickup apparatus according to claim 1, wherein said image magnifying means is electronic-zoom means for electronically magnifying the image.

4. An image pickup apparatus according to claim 1, wherein said adjusting means is exposure control means for executing control so that a luminance level of the picked-up image signal outputted from said image pickup means becomes constant.

5. An image pickup apparatus according to claim 4, wherein said control means controls the response characteristic by varying, according to the image magnifying value, an amount of exposure correction to be performed by said control means in one control cycle.

6. An image pickup apparatus according to claim 4, wherein said control means controls the response characteristic by varying a control interval of said control means according to the image magnifying value.

7. An image pickup apparatus according to claim 5 or 6, wherein said control means has a table on which the image magnifying value and control values of said control means are memorized in such a manner that the image magnifying value and the control values correspond to each other.

8. An image pickup apparatus according to claim 1, wherein said adjusting means is white balance control means for executing white balance control by controlling a gain of a color signal of the picked-up image signal outputted from said image pickup means.

9. An image pickup apparatus according to claim 8, wherein said control means controls the response characteristic by varying, according to the image magnifying value, an amount of correction to be performed by said white balance control means in one control cycle.

10. A video camera comprising:
    a photographing lens;
    an image pickup element for picking up an image formed by said photographing lens;
    image signal processing means for performing processing on an output signal of said image pickup element and producing a predetermined image signal;
    exposure control means for controlling an iris means;
    image magnifying means for magnifying a size of an image represented by the predetermined image signal; and
    control means for controlling to reduce a response speed of said exposure control means in accordance with an increase of an image magnifying value of said image magnifying means.

11. A video camera according to claim 10, wherein said exposure control means performs exposure control by varying at least one of an iris, a shutter and a gain.

12. A video camera according to claim 10, wherein said image magnifying means is an optical zoom lens.

13. A video camera according to claim 10, wherein said image magnifying means is electronic-zoom means for electronically magnifying the image.

14. A video camera according to claim 10, wherein said control means controls the response characteristic by varying, according to the image magnifying value, an amount of exposure correction to be performed by said exposure control means in one control cycle.

15. A video camera according to claim 10, wherein said control means controls the response characteristic by varying a control interval of said exposure control means according to the image magnifying value.

16. A video camera comprising:
    a photographing lens:
    an image pickup element for picking up an image formed by said photographing lens;
    image signal processing means for performing processing on an output signal of said image pickup element and producing a predetermined image signal;
    white balance means for controlling a white balance of the predetermined image signal;
    image magnifying means for magnifying a size of an image represented by the predetermine image signal; and
    control means for controlling to reduce a response speed of said white balance control means in accordance with an increase of image magnifying value of said image magnifying means.

17. A video camera according to claim 16, wherein said white balance control means performs white balance control by controlling a gain of a color signal of a picked-up image signal outputted from said image pickup element.

18. A video camera according to claim 17, wherein said control means controls the response characteristic by varying, according to the image magnifying value, an amount of correction to be performed by said white balance control means in one control cycle.

19. An apparatus according to claim 1, wherein said control means controls the response speed so as to restrain a change of the state of the pickup image caused by a change of an area occupied by an object image in a screen in accordance with a change of the image magnifying value of said image magnifying means.

20. An apparatus according to claim 10, wherein said control means controls the response speed so as to restrain a change of the state of the exposure caused by a change of an area occupied by an object image in a screen in accordance with an operation of said image magnifying means.

21. An apparatus according to claim 16, wherein said control means controls the response speed so as to restrain a change of the state of the white balance caused by a change of an area occupied by an object image in a screen in accordance with an operation of said image magnifying means.

* * * * *

UNITED STATES PATENT AND TRADEMARK OFFICE
CERTIFICATE OF CORRECTION

PATENT NO.    : 6,618,091 B1
DATED         : September 9, 2003
INVENTOR(S)   : Kyoji Tamura It is certified that error appears in the above-identified patent and that said Letters Patent is hereby corrected as shown below:

Column 6,
Line 60, delete "zoom13" and insert -- zoom13 --.

Signed and Sealed this

Twenty-ninth Day of June, 2004

JON W. DUDAS
*Acting Director of the United States Patent and Trademark Office*